United States Patent [19]

Serna

[11] Patent Number: 4,986,902

[45] Date of Patent: Jan. 22, 1991

[54] CHLORINATION SYSTEM FOR A WATER TO BE TREATED

[75] Inventor: Pierre Serna, Portet, France

[73] Assignee: Societe Nationale Elf Aquitaine (Production), Courbevoie, France

[21] Appl. No.: 347,900

[22] PCT Filed: Jun. 29, 1988

[86] PCT No.: PCT/FR88/00346

§ 371 Date: May 4, 1989

§ 102(e) Date: May 4, 1989

[87] PCT Pub. No.: WO89/00546

PCT Pub. Date: Jan. 26, 1989

[30] Foreign Application Priority Data

Jul. 17, 1987 [FR] France ................... 87 10111

[51] Int. Cl.$^5$ ................................................. C02F 1/00
[52] U.S. Cl. ........................................ 210/86; 210/87; 210/96.1; 210/205; 210/739; 210/754; 210/755
[58] Field of Search ............... 210/754, 755, 739, 96.1, 210/205, 86, 87

[56] References Cited

U.S. PATENT DOCUMENTS

| | | | |
|---|---|---|---|
| 1,744,493 | 1/1930 | Nix | 210/126 |
| 2,463,304 | 3/1949 | Pick | 116/114 |
| 3,386,808 | 6/1968 | Handeland | 210/198.1 |
| 3,457,167 | 7/1969 | Spiegel et al. | 210/612 |
| 3,772,193 | 11/1973 | Nelli et al. | 210/169 |
| 3,860,394 | 1/1975 | Tepas, Jr. et al. | 210/169 |
| 3,870,471 | 3/1975 | Tepos, Jr. et al. | 210/169 |
| 3,899,425 | 8/1975 | Lewis | 210/754 |
| 4,056,470 | 11/1977 | Carpenter | 210/754 |
| 4,115,270 | 9/1978 | Phillips | 210/754 |
| 4,224,154 | 9/1980 | Steininger | 210/169 |
| 4,293,425 | 10/1981 | Price | 210/754 |
| 4,472,256 | 9/1984 | Hilbig | 210/754 |
| 4,519,914 | 5/1985 | Etani | 210/696 |
| 4,732,689 | 3/1988 | Harvey et al. | 210/754 |

FOREIGN PATENT DOCUMENTS 2292671 6/1976 France .
1600289 10/1981 United Kingdom .
8200710 3/1982 World Int. Prop. O. .

Primary Examiner—Frank Spear
Assistant Examiner—Cynthia L. Nessler
Attorney, Agent, or Firm—Oblon, Spivak, McClelland, Maier & Neustadt

[57] ABSTRACT

A system for chlorination of a fluid to be treated, which includes a container containing trichlorocyanuric acid in a solid and compact form, a first pipe for supplying the container with dissolving fluid, an evacuation pipe in which the chlorinated fluid circulates, connecting the container to a pipe which contains the fluid to be treated, a chlorine analyzer connected to the pipe and which includes a mechanism for continuously measuring the amount of active chlorine in the treated fluid and released constantly by direct contact of the fluid to be treated with a surface of the trichlorocyanuric acid; and a flow rate regulation mechanism connected to a supply and including a mechanism to for constantly varying a continuous flow rate of the dissolving fluid passing into the container as a function of the amount of active chlorine present in the treated fluid and measured by the chlorine analyzer.

10 Claims, 1 Drawing Sheet

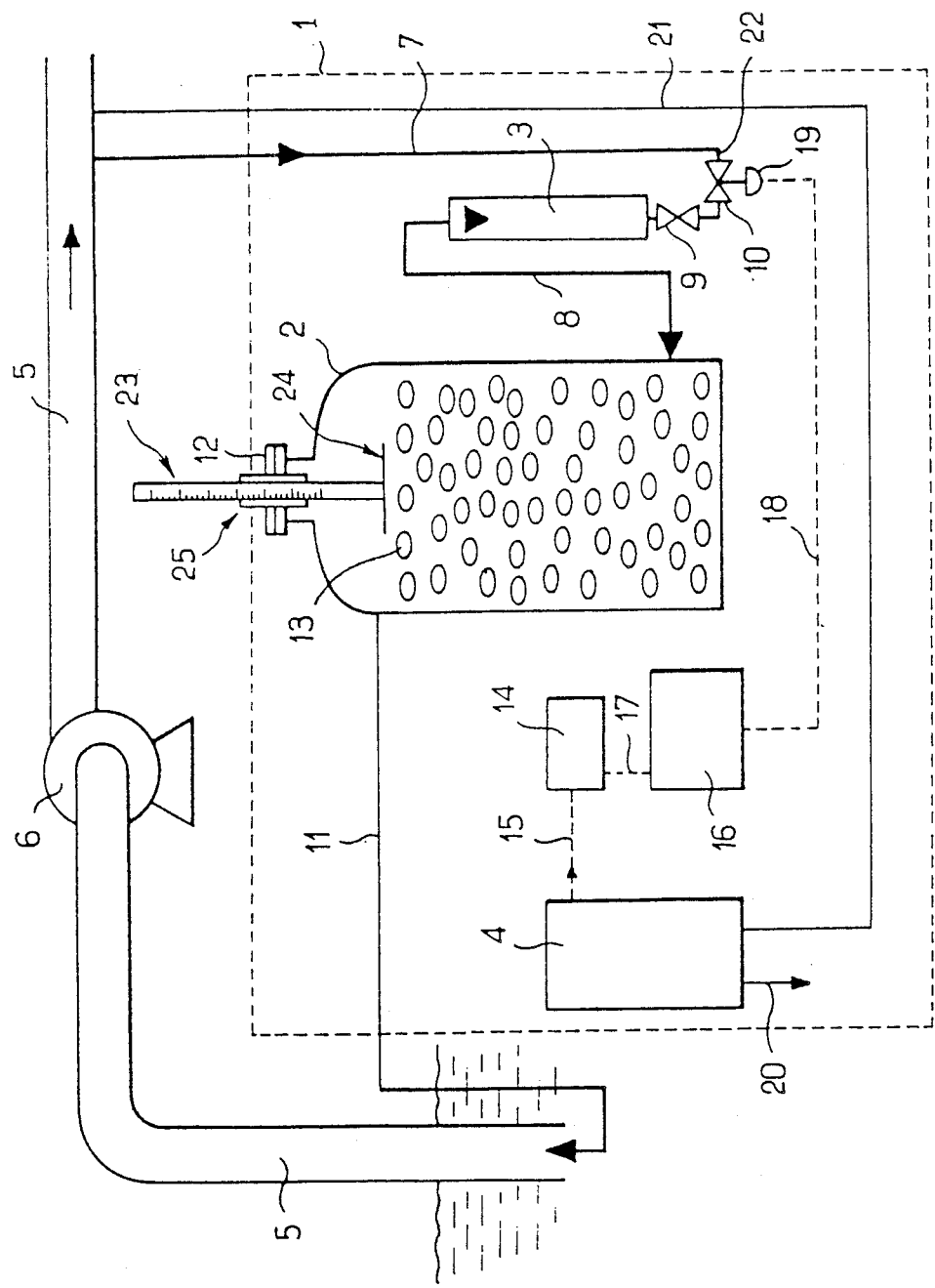

CHLORINATION SYSTEM FOR A WATER TO BE TREATED

TECHNICAL FIELD

This invention relates to a chlorination system for water for industrial use or for consumption and more particularly for water used in a single pass system and still more particularly for water that is used in the petroleum industry.

BACKGROUND ART

Generally, sterilization of water is essentially performed by chlorination obtained either by an electrochlorination or by an addition of Javelle water or of liquid chlorine.

Actually, surface water such as that found in seas and lagoons contains various organic elements which can proliferate and thus cause fouling of the water circulation pipes, leading to very considerable head losses, a considerable increase in the rate of clogging of the filters, or further, a clogging of the safety filters by growth of Copepoda whose eggs pass through filtering media such as prelayers. Thus, it has been found that sterilization of water can be as important as the filtration or the anticorrosion treatment to prevent deposits and, in the case of the petroleum industry, to prevent clogging of the formation into which water is injected.

Javelle water, whose concentration is expressed in chlorometric degree, exhibits drawbacks in industry for sterilization of water because it is susceptible to aging and unstable in high concentration, loss of activity being able to reach 6 to 10 chlorometric degrees during the first 24 hours after production. Because of this, it is necessary to provide fresh Javelle water several times per week.

Liquid chlorine is still more difficult to handle because of injection systems that are relatively complex to put in place, not taking into account the safety problems which necessitate taking great precautions. Also, the shipping, handling and storing of empty bottles that have contained liquid chlorine require the same type of precautions.

Another chlorination method is the one called electrochlorination which uses electrolysis. Electrochlorination is widely used for treating sea water despite the drawbacks due to the considerable maintenance required; however, when the salinity of the water to be treated is less than that of the sea water, the production of chlorine by the electrolysis cell lowers. For example, for saline concentrations less than 4 g/l, the faradic output is low and the dimensioning of the chlorination unit becomes important for productions of chlorine necessary for the treatment.

In a closed-loop recycling system, for example in the treatment of swimming pool water, most generally chlorocyanuric compounds are used which exhibit the advantage of having a slow solubility in water and of containing more than 88% by weight of active chlorine, as is the case for trichlorocyanuric acid. However, the treatment of water in a closed-loop recycling system, for example in a swimming pool, requires only an adjustment of the amount of chlorine contained in the volume of water in the system. This is obtained by periodic addition and "all or nothing" operation of the chlorination cell. The amount of chlorine contained in the treated water can vary rather considerably but without exhibiting a drawback, the chlorine keeping a sufficiently long time and without significantly increasing the consumption of active products.

Trichlorocyanuric acid mixed with boric acid and with calcium stearate is also used for the treatment of municipal waste water, as is described in U.S. Pat. No. 4,054,518. In this patent, the compound described is in the form of tablets, placed vertically in a pipe in which the water to be treated circulates. Although it involves a single pass system and the surface of the tablets of compound exposed to the water is a function of the flow rate of the water in the pipe, it does not comprise any means for intervening constantly and in real time on the amount of active chlorine released by the tablets. Actually, the relation which exists between the tablets and the water flow rate comes from the sole surface of the tablets in contact with the water. The higher the layer of water is in the pipe, the more immersed are the tablets.

DISCLOSURE OF INVENTION

This invention has as its object to eliminate said drawbacks and to propose a system suitable for water consumption in a single pass system and which, continuously, makes it possible to adjust the amount of active chlorine to be introduced into the water to be treated at the optimum value for the treatment to be successful.

This invention has as its object to provide a system for chlorination of a water to be treated, of the type comprising a volume or container containing a reserve of trichlorocyanuric acid in the form of compact and solid pellets, means to supply said volume with water, an evacuation pipe in which the water charged with chlorine circulates, connecting said volume to the line of water to be treated, a water line in which the concentration of active chlorine is analyzed continuously by an automatic analyzer which sends a signal to a regulator making it possible to act on a regulation valve causing the water flow rate passing through the volume to vary and, thereby, causing the flow of active chlorine injected into the line of water to be treated to vary.

By constantly measuring the active chlorine content in the water to be treated, it is possible to act on the flow rate of water passing through the volume that contains the pellets with the trichlorocyanuric acid and also on the amount of active chlorine to be produced to inject into the water to be treated.

Furthermore, the active chlorine content can be adapted as a function of the nature of the living or inert beings that can be found in the water to be treated, to reduce considerably both the fouling of the pipes and the clogging of the filters which, thanks to this invention, have a longer cycle time.

BRIEF DESCRIPTION OF THE DRAWINGS

Other advantages and characteristics will come out in reading the description given by way of nonlimiting illustration of a preferred embodiment of the invention, and accompanying drawings in which the single figure is a diagrammatic representation of the system according to the invention.

The system diagrammed in the rectangle represented by broken line 1 comprises a dissolver 2, a flow rate indicator 3 and a chlorine analyzer device 4. A pipe 5 with a diameter appropriate to the flow rate of water to be treated, for example 200 m$^3$/hour, has one end immersed in the water, and comprises a pump 6 for circulating and bringing the treated water to the treated water consumption installation, not shown.

The supplying of dissolver 2 with water is performed by a main pipe 7, 8 and manual valve 9, said pipe 7 being connected to pipe 5 so as to benefit from the pressure existing in said pipe 5, downstream from pump 6, which assures the power necessary for the circulation of the water in dissolver 2. The flow rate of water introduced varies within wide limits and it is adjusted by an automatic valve 10 placed on main pipe 7. A pipe 11 for extraction of chlorinated water connects dissolver 2 to pipe 5 for water to be treated.

Dissolver 2 is equipped with a quick-opening cover 12 for loading pellets 13 of trichlorocyanuric acid which, on contact with the water introduced by pipe 8 at a flow rate, for example, between 1 and 10 m$^3$/hr, dissolve and release active chlorine. The chlorinated water is extracted through pipe 11 and injected into pipe 5 for water to be treated. The total weight of the pellets placed in the dissolver is quite obviously a function both of the flow rate and of the frequency of anticipated reloading; in tests performed, it has been on the order of 200 kgs.

The chlorine analyzer of the ordinary type will not be described in detail, it delivers electrical signals between 4 and 20 mA, to a signal transmitter 14 by a line 15. A regulator 16 is connected by a line 17 to signal transmitter 14 and by a line 18 to a control element 19 of automatic valve 10.

A sampling pipe 21 connects chlorine analyzer 4 to water pipe 5 at a point located downstream from pump 6 so that analyzer 4 continuously analyzes the content of active chlorine present in the treated water which is sent to the petroleum installation, the water analyzed then being evacuated to a tank, not shown, through an adjustable drain 20.

When a variation in the chlorine content is detected by analyzer 4, the latter emits a signal which is transmitted to regulator 16 via signal transmitter 14, regulator 16 governs— by means of device 19— the partial closing or opening of automatic valve 10 so as to adjust the flow rate of water introduced into dissolver 2 at the appropriate value.

Manual valve 9 is provided for the cases where there would be failure in the automatic circuit or in certain extreme cases, the operating conditions are such that automatic control does not prove to be necessary.

Of course, the invention is in no way limited to the embodiments described and represented, it is capable of numerous variants accessible to a person skilled in the art depending on the applications planned, without departing from the scope of the invention.

Finally, means are provided to measure the level of undissolved pellets 13 in dissolver 2, said means consisting of a graduated rod 23 passing through cap 12, equipped with a feeler in the form of a blade 24 at its lower end and guided through a gland 25 of sufficient length to assure the verticality of said rod 23.

Preferably, all these means made of a material resistant to chlorine attack, such as for example PVC.

I claim:

1. A system for chlorination of a fluid to be treated, which comprises:
    a container containing trichlorocyanuric acid in a solid and compact form,
    a first pipe for supplying said container with dissolving fluid,
    an evacuation pipe in which chlorinated fluid circulates, connecting said container to a pipe which contains the fluid to be treated,
    a chlorine analyzer connected to said pipe and which includes means for continuously measuring the amount of active chlorine in the treated fluid and released constantly by direct contact of the fluid to be treated with a surface of the trichlorocyanuric acid; and
    flow rate regulation means (16) connected to supply means and including means to for constantly varying a continuous flow rate of the dissolving fluid passing into said container as a function of the amount of active chlorine present in the treated fluid and measured by said chlorine analyzer.

2. A system according to claim 1, wherein the regulation means comprises a control element which acts on an automatic valve.

3. A system according to claim 1, wherein the regulation means comprises a signal transmitter which is connected to the chlorine analyzer and which delivers as an output a signal representative of the amount of chlorine measured in the treated fluid.

4. A system according to claim 1, which comprises a circulation pump connected to said second pipe and means connected to said container for supplying said container with treated fluid from a point on the second pipe downstream from said circulation pump from which the treated fluid that must be analyzed in said chlorine analyzer is also sampled.

5. A system according to claim 4, wherein the first pipe includes a manual valve and a flow rate indicator for manual operation in case of failure of the automatic system.

6. A system according to claim 4, wherein the regulation means comprises a control element which acts on an automatic valve.

7. A system according to claim 1, which comprises an automatic valve positioned in the first pipe and wherein the regulation means comprises means for controlling said automatic valve.

8. A system according to claim 7, wherein the regulation means further comprises a signal transmitter which is connected to the chlorine analyzer and which delivers as an output a signal representative of the amount of chlorine measured in the treated fluid.

9. A system according to claim 1, which comprises means for measuring the quantity of pellets of trichlorocyanuric acid that are not yet dissolved.

10. A system according to claim 9, wherein the means for measuring the quantity of pellets of trichlorocyanuric acid that are not yet dissolved comprises a fluid-tight gland, a rod passing through said fluid-tight gland, and a quick-opening cover of said container, said rod carrying on a lower end thereof a feeler in contact with pellets of said trichlorocyanuric acid.

* * * * *